United States Patent
Pomme

[11] Patent Number: 5,722,250
[45] Date of Patent: Mar. 3, 1998

[54] DEVICE FOR HEATING AND AIR-CONDITIONING THE PASSENGER COMPARTMENT OF A MOTOR VEHICLE WITH AN ELECTRIC MOTOR

[75] Inventor: Vincent Pomme, Montigny le Bretonneux, France

[73] Assignee: Valeo Climatisation, La Verriere, France

[21] Appl. No.: 736,515

[22] Filed: Oct. 24, 1996

[30] Foreign Application Priority Data

Oct. 26, 1995 [FR] France ................... 95 12650

[51] Int. Cl.[6] ................................................. B60H 1/32
[52] U.S. Cl. ................................. 62/244; 62/324.6
[58] Field of Search .................. 62/239, 244, 324.1, 62/324.6

[56] References Cited

U.S. PATENT DOCUMENTS

| | | | |
|---|---|---|---|
| 4,920,757 | 5/1990 | Gazes et al. | 62/324.1 |
| 4,944,156 | 7/1990 | Yamamoto et al. | 62/324.6 |
| 5,239,838 | 8/1993 | Tressler | 62/324.1 |
| 5,275,008 | 1/1994 | Song et al. | 62/324.6 |
| 5,341,868 | 8/1994 | Nakata | 62/228.4 |
| 5,488,837 | 2/1996 | Sekino et al. | 62/244 |
| 5,600,962 | 2/1997 | Aizawa et al. | 62/324.6 |

FOREIGN PATENT DOCUMENTS

| | | |
|---|---|---|
| 42 38 364 | 5/1994 | Germany. |
| 43 27 261 | 10/1994 | Germany. |
| 2 188 713 | 1/1983 | United Kingdom. |

OTHER PUBLICATIONS

French Search Report Jul. 26, 1996.

*Primary Examiner*—William E. Tapolcai
*Attorney, Agent, or Firm*—Morgan & Finnegan, L.L.P.

[57] ABSTRACT

The invention concerns a device for the heating and air-conditioning of the passenger compartment of a motor vehicle with an electric motor. The device comprises a main loop containing an internal heat exchanger suitable for exchanging heat with a flow of air sent into the passenger compartment an external heat exchanger suitable for exchanging heat with a flow of air external to the passenger compartment and a pressure reducing valve interposed between the internal heat exchanger and the external heat exchanger; a secondary loop containing a compressor and an evaporator connected to a cooling circuit for the power circuit associated with the electric motor of the vehicle, and a valve for switching between the main loop and the secondary loop in order to cause the refrigerating fluid to circulate in the main loop in a chosen direction of circulation.

22 Claims, 1 Drawing Sheet

DEVICE FOR HEATING AND AIR-CONDITIONING THE PASSENGER COMPARTMENT OF A MOTOR VEHICLE WITH AN ELECTRIC MOTOR

FIELD OF THE INVENTION

The invention concerns a device for heating and air-conditioning the passenger compartment of a motor vehicle with an electric motor, and more particularly a device of the type comprising a refrigerating fluid circulation circuit having a main loop containing an internal heat exchanger suitable for exchanging heat with a flow of air sent into the passenger compartment, an external heat exchanger suitable for exchanging heat with a flow of air external to the passenger compartment, and a pressure reducing valve interposed between the internal heat exchanger and the external heat exchanger; a secondary loop containing a compressor; and means of switching between the main loop and the secondary loop in order to cause the refrigerating fluid to circulate in the main loop in a chosen direction of circulation.

BACKGROUND OF THE INVENTION

In a device of this type, the refrigerating fluid can circulate in the main loop in a first direction of circulation, by means of which the internal heat exchanger and external heat exchanger serve respectively as a condenser and evaporator, which makes it possible to provide the heating of the passenger compartment.

The refrigerating fluid can also circulate in the main loop in a second direction of circulation, by means of which the internal heat exchanger and external heat exchanger serve respectively as an evaporator and condenser, which makes it possible to provide the cooling or air-conditioning of the passenger compartment.

Such a device operates according to the principle of a reversible heat pump which makes it possible, using the same basic components, to provide either the heating or the air-conditioning of the passenger compartment of the motor vehicle.

Both in heating mode and in air-conditioning mode, the circulation of the refrigerating fluid takes place under the action of the compressor, which is driven from the vehicle batteries.

However, as these batteries also supply the electric motor serving for the propulsion of the vehicle, the energy expended by the compressor is effected to the detriment of the range of the vehicle.

The aim of the invention is notably to overcome this drawback.

One aim of the invention is in particular to procure a heating and air-conditioning device of the type defined above, which makes it possible to minimise the expenditure of energy, whether in heating mode or in air-conditioning mode.

SUMMARY OF THE INVENTION

According to the present invention, there is provided a heating and air-conditioning device comprising a refrigerating fluid circulation circuit having a main loop containing an internal heat exchanger suitable for exchanging heat with a flow of air sent into the passenger compartment, an external heat exchanger suitable for exchanging heat with a flow of air external to the passenger compartment, and a pressure reducing valve interposed between the internal heat exchanger and the external heat exchanger; a secondary loop containing a compressor; and means of switching between the main loop and the secondary loop in order to cause the refrigerating fluid to circulate in the main loop in a chosen direction of circulation, in which the secondary loop contains an evaporator connected to a circuit for cooling the power circuit associated with the electric motor of the vehicle.

In fact, in a vehicle with an electric motor, the power circuit associated with the electric motor, which notably comprises the batteries, gives off a certain amount of heat energy which, up till now, was dissipated into the atmosphere as a pure loss.

The invention makes it possible at least partly to recover this heat energy by virtue of the evaporator contained in the secondary loop. This heat energy is conveyed to the refrigerating fluid, which is particularly advantageous in heating mode.

According to another characteristic of the invention, the switching means are able to adopt two different positions:

a heating position, in which the refrigerating fluid coming from the compressor is sent first of all to the internal heat exchanger which fulfils the role of condenser, and then passes through the pressure reducing valve, before being sent to the external heat exchanger which fulfils the role of evaporator; and an air-conditioning position, in which the refrigerating fluid coming from the compressor is sent first of all to the external heat exchanger which fulfils the role of condenser, and then passes through the pressure reducing valve, before being sent to the internal heat exchanger which fulfils the role of evaporator.

According to another characteristic of the invention, a bypass pipe containing a stop valve is interposed between the main loop and the secondary loop, so that, in the heating position, the stop valve is closed so that the refrigerating fluid necessarily passes through the evaporator whilst, in the air-conditioning position, the refrigerating fluid can either bypass the evaporator when the stop valve is open, or pass through the evaporator when the stop valve is closed.

Thus, in the heating position, the refrigerating fluid passes successively through the external heat exchanger (serving as evaporator) and the evaporator of the secondary loop.

On the other hand, in the air-conditioning position, the refrigerating fluid can bypass the evaporator of the secondary loop, in which case the fluid circulates between the internal heat exchanger serving as an evaporator and the external heat exchanger serving as a condenser.

As a variant, the refrigerating fluid can pass through the evaporator of the secondary loop, so that the fluid passes successively through the internal heat exchanger serving as evaporator and then the evaporator of the secondary loop.

In the latter case, the evaporator enables the power circuit associated with the electric motor of the vehicle to be cooled.

According to another characteristic of the invention, the bypass pipe is connected on the one hand to a point in the main loop which lies between the switching means and the internal heat exchanger and on the other hand to a point in the secondary loop which lies between the compressor and the evaporator.

An evaporation pressure regulator is advantageously provided in the secondary loop between the switching means and the evaporator, which makes it possible to prevent icing of the external exchanger in the heating mode of the heating and air-conditioning device.

The switching means interposed between the main loop and the secondary loop advantageously comprise a four-way valve.

According to another characteristic of the invention, the evaporator of the secondary loop is able to exchange heat between the refrigerating fluid and a fluid, for example water with antifreeze added, serving for the cooling of the power circuit of the motor vehicle.

The invention also makes provision for a reservoir of the bi-directional type, that is to say one which can have the refrigerating fluid pass through it in one direction or the other, to be disposed in the main loop between the internal heat exchanger and the pressure reducing valve. This reservoir is designed to absorb the variations in volume of the refrigerating fluid.

According to another characteristic of the invention, the external heat exchanger is mounted in a duct for extracting the air coming from the passenger compartment.

Thus, in heating mode, the external heat exchanger which fulfils the role of evaporator can take off part of the heat energy coming from the passenger compartment, which would normally be dissipated into the atmosphere as pure loss.

The invention also makes provision for the extraction duct to have an air inlet opening out inside the passenger compartment, an air inlet opening out outside the passenger compartment and controlled by a flap, and an air outlet opening out outside the passenger compartment, and for the extraction duct to house a fan, which makes it possible to send, to the external heat exchanger, air extracted from the passenger compartment and, where applicable, air coming from outside the passenger compartment.

BRIEF DESCRIPTION OF THE DRAWINGS

In the following description, given solely by way of example, reference is made to the accompanying drawings, in which.

DESCRIPTION OF THE PREFERRED EMBODIMENTS

Figures 1, 2:
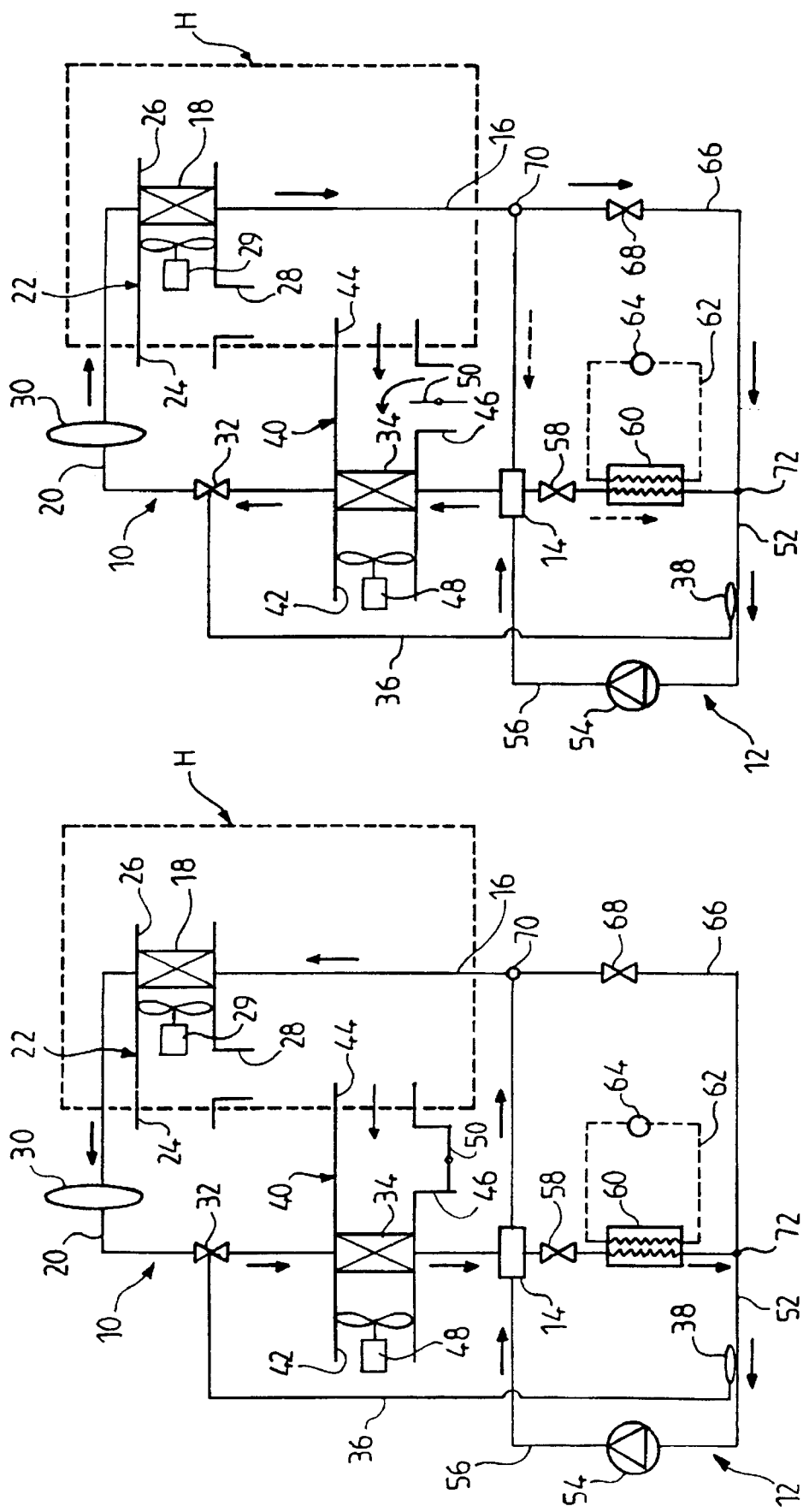
FIG. 1 is a diagrammatic depiction of a heating and air-conditioning device according to the invention used in heating mode.
FIG. 2 is a view similar to that of FIG. 1 in air-conditioning mode.

The device depicted in FIG. 1 comprises a main loop 10 and a secondary loop 12 suitable for both of them having a refrigerating fluid pass through them, and a switching valve 14, of the four-way type, connecting the two loops to each other.

The main loop 10 comprises a conduit 16 connecting the valve 14 to a heat exchanger 18 and a conduit 20 connecting the heat exchanger 18 to the valve 14.

The heat exchanger 18 is placed in an air duct 22, which has an air inlet 24 and an air outlet 26 which open out respectively outside and inside the passenger compartment H of a motor vehicle. The contour of the passenger compartment is depicted diagrammatically by a broken line. The duct 22 also comprises a recirculation air inlet 28 which opens out directly in the passenger compartment. In addition, the duct 22 houses on its inside a fan 29 able to impel a flow of air into the passenger compartment H.

On the conduit 20 there are placed successively, starting from the heat exchanger 18, a reservoir 30, a pressure reducing valve 32 and an external heat exchanger 34.

The reservoir 30 is a reservoir of the bi-directional type which can have the refrigerating fluid pass through it in one direction or the other and serving to compensate for variations in volume of the fluid.

The pressure reducing valve 32 is connected, by means of a duct 36, to a bulb 38, the function of which will be explained later.

The external heat exchanger 34 is mounted inside an air duct 40 which has an air outlet 42 and an air inlet 44 opening out respectively outside and inside the passenger compartment H.

In addition, the duct 40 comprises another air inlet 46 which opens towards the outside of the passenger compartment and which is controlled by a flap 50. A fan 48 disposed close to the air outlet 42 makes it possible to draw in a flow of air coming from inside the passenger compartment and, where applicable, a flow of air coming from outside the passenger compartment, depending on whether the flap 50 is in the closed position (FIG. 1) or in the open position (FIG. 2). The flow of air thus drawn in is sent through the heat exchanger 34.

The secondary loop 12 comprises a conduit 52 which connects the valve 14 to a compressor 54 and a conduit 56 which connects the compressor 54 to the valve 14.

The conduit 52 contains successively, starting from the valve 14, an evaporation pressure regulator 58 and an evaporator 60. The evaporator 60 is connected to a cooling circuit 62 coupled to the power circuit 64 associated with the electric motor (not shown) providing the propulsion of the motor vehicle on which the device of the invention is mounted.

The power circuit 64 comprises the different electric and/or electronic components associated with the electric motor of the vehicle and which give off thermal energy, notably the vehicle batteries.

The heat exchanger 60 thus makes it possible to exchange heat between the cooling circuit 62 and the circuit circulating the refrigerating fluid in the secondary loop 12. In other words, the evaporator 60 makes it possible at least partly to absorb the heat energy of the cooling circuit 62 in order to transfer it to the refrigerating fluid passing through the secondary loop 12.

The bulb 38 associated with the pressure reducing valve 32 is disposed on the suction side of the compressor 54 in order to sense the temperature value at the suction and accordingly regulate the flow of fluid through the pressure reducing valve 32.

The device also comprises a bypass pipe 66 on which a stop valve 68 is mounted, produced in the form of a solenoid valve. The bypass pipe 66 is connected on the one hand to a point 70 in the main loop 10 which lies between the switching valve 14 and the internal heat exchanger 18 and on the other hand to a point 72 in the secondary loop 12 which lies between the compressor 54 and the evaporator 60.

In the heating mode of FIG. 1, the valve 14 occupies a heating position which enables the refrigerating fluid to circulate in the main loop 10 and in the secondary loop 12 in the direction indicated by the arrows. The refrigerating fluid in a gaseous state is compressed by the compressor 54 and then sent to the internal heat exchanger 18 which fulfils the role of condenser. The refrigerating fluid thus condensed leaves the condenser 18, passes through the reservoir 30, is expanded in the pressure reducing valve 32 and then passes through the external heat exchanger 34 which fulfils the role of evaporator.

The refrigerating fluid is partially evaporated in the heat exchanger 34 by the heat energy extracted from the passenger compartment H. It is then evaporated completely in thee evaporator 60 by heat exchange with the cooling liquid passing through the cooling circuit 62.

The refrigerating fluid thus vaporised returns to the inlet of the compressor 54 before continuing another cycle. It should be noted that the bulb 38 placed at the inlet of the compressor 54 makes it possible to detect the temperature of the fluid at the inlet of the compressor 54 and to act on the pressure reducing valve 32.

In addition, the evaporation pressure regulator 58 is regulated so that the temperature of the air leaving the heat exchanger 34 is maintained at a sufficiently high value to prevent icing.

In the heating operating mode, the solenoid valve 68 is closed, which makes the bypass duct 66 totally inoperative.

In this heating mode, the evaporator 34 recovers the heat energy from the air extracted from the passenger compartment and the evaporator 60 recovers the heat energy from the power circuit associated with the electric motor of the vehicle. The energy thus recovered and conveyed by the refrigerating fluid is then returned to the passenger compartment H by the internal heat exchanger 18 which serves as a condenser.

In the air-conditioning mode depicted in FIG. 2, the switching valve 14 occupies another position, or air-conditioning position.

The refrigerating fluid in the gaseous state sent by the compressor 54 is directed, by the valve 14, directly to the external heat exchanger 34, which here fulfils the role of condenser. From there, the fluid thus condensed passes through the pressure reducing valve 32, and then the reservoir 30, before reaching the internal heat exchanger 18, which here fulfils the role of evaporator. The refrigerating fluid is vaporised in the heat exchanger 18 and is then returned to the compressor 54 in two different ways.

In a first operating mode, the valve 68 is open and the refrigerating fluid in the gaseous state, which leaves the point 70, then reaches the compressor 54, passing through the bypass duct 66, as shown by the arrows. As a result the refrigerating fluid does not pass through the evaporator 60. Thus the refrigerating fluid is condensed in the external heat exchanger 34, giving off heat discharged into the external environment, and is then evaporated in the external heat exchanger 18 fulfilling the role of evaporator. As a result the flow of air which is sent to the inside of the passenger compartment under the action of the fan 29 is previously cooled by heat exchange in the exchanger 18.

In a second operating mode, the solenoid valve 68 is closed, which makes the bypass pipe 66 inoperative. In this operating mode, the refrigerating fluid leaving the point 70 is sent directly to the valve 14, as shown by the arrow in broken lines, and then reaches thereafter the compressor 54, passing successively through the regulator 58 and evaporator 60, as indicated also by the arrow in broken lines. Thus, in the latter possibility, the refrigerating fluid makes it possible to cool the power circuit associated with the vehicle engine, notably the batteries, which makes it possible to increase the range of the vehicle. On the other hand, this operating mode entails a certain pressure loss, since the refrigerating fluid must pass through the evaporator 60.

This is the reason why it may be advantageous, in certain cases, to bypass the evaporator 60, when the solenoid valve 68 is in its open position.

Naturally the invention is not limited to the embodiment described previously by way of example and extends to other variants.

The device of the invention makes it possible to optimise the functioning in heating mode and air-conditioning mode whilst minimising the consumption of the batteries of the motor vehicle with an electric motor, on which the device is installed.

I claim:

1. Device for heating and air-conditioning the passenger compartment of a motor vehicle with an electric motor, of the type comprising a refrigerating fluid circulation circuit having a main loop containing an internal heat exchanger suitable for exchanging heat with a flow of air sent into the passenger compartment, an external heat exchanger suitable for exchanging heat with a flow of air external to the passenger compartment, and a pressure reducing valve interposed between the internal heat exchanger and the external heat exchanger; a secondary loop containing a compressor; and means of switching between the main loop and the secondary loop in order to cause the refrigerating fluid to circulate in the main loop in a chosen direction of circulation, wherein the secondary loop contains an evaporator connected to a circuit for calling the power circuit associated with the electric motor of the vehicle; and wherein an evaporation pressure regulator is provided in the secondary loop between the switching means and the evaporator.

2. The device of claim 1, wherein the switching means are able to adopt two different positions:

a heating position, in which the refrigerating fluid coming from the compressor is sent first of all to the internal heat exchanger which fulfils the role of condenser, and then passes through the pressure reducing valve before being sent to the external heat exchanger which fulfils the role of evaporator; and an air-conditioning position, in which the refrigerating fluid coming from the compressor is sent first of all to the external heat exchanger which fulfils the role of condenser, and then passes through the pressure reducing valve before being sent to the internal heat exchanger which fulfils the role of evaporator.

3. The device of claim 2, wherein a bypass pipe containing a stop valve is interposed between the main loop and the secondary loop so that, in the heating position, the stop valve is closed so that the refrigerating fluid necessarily passes through the evaporator whilst, in the air-conditioning position, the refrigerating fluid can either bypass the evaporator when the stop valve is open, or pass through the evaporator when the stop valve is closed.

4. The device of claim 3, wherein the bypass pipe is connected on the one hand to a point in the main loop which lies between the switching means and the internal heat exchanger and on the other hand to a point in the secondary loop which lies between the compressor and the evaporator.

5. The device of claim 1, wherein the switching means comprise a four-way valve.

6. The device of claim 1, wherein the evaporator is able to exchange heat between the refrigerating fluid and a fluid serving for the cooling of the power circuit associated with the vehicle motor.

7. The device of claim 1, wherein a bi-directional reservoir suitable for having the refrigerating fluid pass through it in one direction or the other, is disposed in the main loop between the internal heat exchanger and the pressure reducing valve.

8. The device of claim 1, wherein the external heat exchanger is mounted in a duct for extracting the air coming from the passenger compartment.

9. Device for heating and air-conditioning the passenger compartment of a motor vehicle with an electric motor, of the type comprising a refrigerating fluid circulation circuit having a main loop containing an internal heat exchanger suitable for exchanging heat with a flow of air sent into the passenger compartment, an external heat exchanger suitable for exchanging heat with a flow of air external to the passenger compartment, and a pressure reducing valve interposed between the internal heat exchanger and the external heat exchanger; a secondary loop containing a compressor; and means of switching between the main loop and the secondary loop in order to cause the refrigerating fluid to circulate in the main loop in a chosen direction of circulation, wherein the secondary loop contains an evaporator connected to a circuit for calling the power circuit associated with the electric motor of the vehicle; wherein the external heat exchanger is mounted in a duct for extracting the air coming from the passenger compartment; and wherein the extraction duct has an air inlet opening out inside the passenger compartment, an air inlet opening out outside the passenger compartment and controlled by a flap and an air outlet opening out outside the passenger compartment, and in that the extraction duct houses a fan which makes it possible to send, to the external heat exchanger air extracted from the passenger compartment and, where applicable, air coming from outside the passenger compartment.

10. The device of claim 9, wherein the switching means are able to adopt two different positions:

a heating position, which the refrigerating fluid coming from the compressor is sent first of all to the internal heat exchanger which fulfills the role of condenser, and then passes through the pressure reducing valve before being sent to the external heat exchanger which fulfills the role of evaporator; and an air-conditioning position, in which the refrigerating fluid coming from the compressor is sent first of all to the external heat exchanger which fulfills the role of condenser, and then passes through the pressure reducing valve before being sent to the internal heat exchanger which fulfills the role of evaporator.

11. The device of claim 10, wherein a bypass pipe containing a stop valve is interposed between the main loop and the secondary loop so that, in the heating position, the stop valve is closed so that the refrigerating fluid necessarily passes through the evaporator whilst, in the air-conditioning position, the refrigerating fluid can either bypass the evaporator when the stop valve is open, or pass through the evaporator when the stop valve is closed.

12. The device of claim 11, wherein the bypass pipe is connected on the one hand to a point in the main loop which lies between the switching means and the internal heat exchanger and on the other hand to a point in the secondary loop which lies between the compressor and the evaporator.

13. The device of claim 9, wherein an evaporation pressure regulator is provided in the secondary loop between the switching means and the evaporator.

14. The device of claim 9, wherein the switching means comprise a four-way valve.

15. The device of claim 9, wherein the evaporator is able to exchange heat between the refrigerating fluid and a fluid serving for the cooling of the power circuit associated with the vehicle motor.

16. The device of claim 9, wherein a bi-directional reservoir suitable for having the refrigerating fluid pass through it in one direction or the other, is disposed in the main loop between the internal heat exchanger and the pressure reducing valve.

17. Device for heating and air-conditioning the passenger compartment of a motor vehicle with an electric motor, of the type comprising a refrigerating fluid circulation circuit having a main loop containing an internal heat exchanger suitable for exchanging heat with a flow of air sent into the passenger compartment, an external heat exchanger suitable for exchanging heat with a flow of air external to the passenger compartment, and a pressure reducing valve interposed between the internal heat exchanger and the external heat exchanger; a secondary loop containing a compressor; and means of switching between the main loop and the secondary loop in order to cause the refrigerating fluid to circulate in the main loop in a chosen direction of circulation, wherein the secondary loop contains an evaporator connected to a circuit for calling the power circuit associated with the electric motor of the vehicle;

wherein the switching means are able to adopt two different positions:

a heating position, which the refrigerating fluid coming from the compressor is sent first of all to the internal heat exchanger which fulfills the role of condenser, and then passes through the pressure reducing valve before being sent to the external heat exchanger which fulfills the role of evaporator; and an air-conditioning position, in which the refrigerating fluid coming from the compressor is sent first of all to the external heat exchanger which fulfills the role of condenser, and then passes through the pressure reducing valve before being sent to the internal heat exchanger which fulfills the role of evaporator; and wherein a bypass pipe containing a stop valve is interposed between the main loop and the secondary loop so that, in the heating position, the stop valve is closed so that the refrigerating fluid necessarily passes through the evaporator whilst, in the air-conditioning position, the refrigerating fluid can either bypass the evaporator when the stop valve is open, or pass through the evaporator when the stop valve is closed.

18. The device of claim 17, wherein the bypass pipe is connected on the one hand to a point in the main loop which lies between the switching means and the internal heat exchanger and on the other hand to a point in the secondary loop which lies between the compressor and the evaporator.

19. The device of claim 17, wherein the switching means comprise a four-way valve.

20. The device of claim 17, wherein the evaporator is able to exchange heat between the refrigerating fluid and a fluid serving for the cooling of the power circuit associated with the vehicle motor.

21. The device of claim 17, wherein a bi-directional reservoir suitable for having the refrigerating fluid pass through it in one direction or the other, is disposed in the main loop between the internal heat exchanger and the pressure reducing valve.

22. The device of claim 17, wherein the external heat exchanger is mounted in a duct for extracting the air coming from the passenger compartment.

* * * * *